Figure 1:
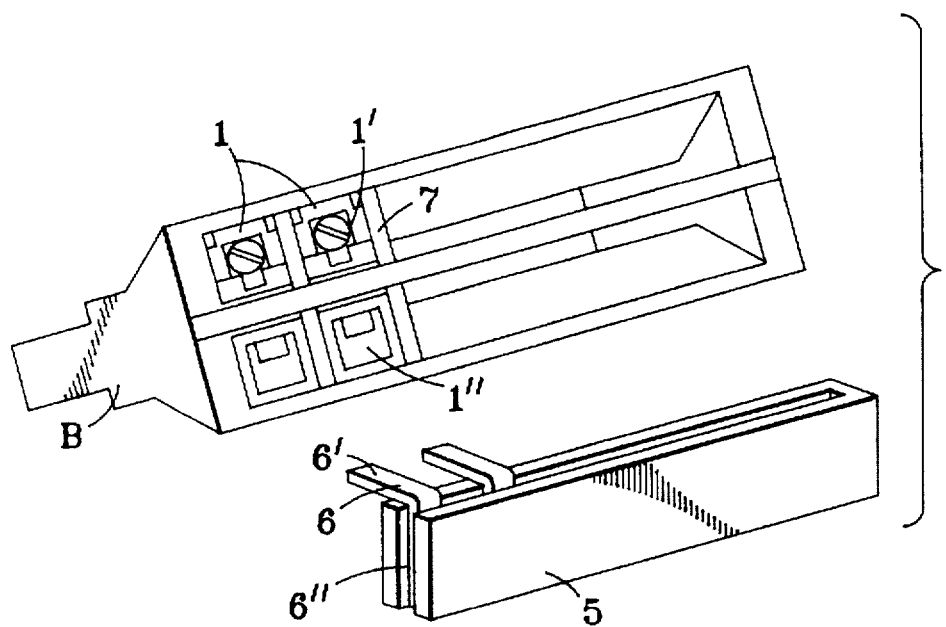

United States Patent [19]

Ribeiro et al.

[11] Patent Number: 5,741,073
[45] Date of Patent: Apr. 21, 1998

[54] UNIFORM TEMPERATURE REFERENCE APPARATUS FOR USE WITH MODULAR TERMINAL BLOCK

[75] Inventors: Kenneth A. Ribeiro, North Reading; Robert E. Goldschmidt, Needham; John Nelson, Worcester; John R. Sullivan, Westford, all of Mass.

[73] Assignee: Kaye Instruments, Inc., Bedford, Mass.

[21] Appl. No.: 529,356

[22] Filed: Sep. 18, 1995

[51] Int. Cl.⁶ .................... G01K 7/00; H01R 4/50
[52] U.S. Cl. .................... 374/182; 439/807
[58] Field of Search ................... 374/181, 182; 439/797, 798, 806, 807

[56] References Cited

U.S. PATENT DOCUMENTS

| | | | |
|---|---|---|---|
| 4,482,261 | 11/1984 | Dewey et al. | 374/181 |
| 4,483,632 | 11/1984 | Dewey et al. | 374/182 |
| 4,804,272 | 2/1989 | Schmitz | 374/181 |
| 5,192,234 | 3/1993 | Heng et al. | 439/806 |
| 5,314,360 | 5/1994 | Jaag | 439/806 |
| 5,340,216 | 8/1994 | Goldschmidt | 374/182 |

Primary Examiner—William L. Oen
Attorney, Agent, or Firm—Rines and Rines

[57] ABSTRACT

A uniform temperature reference block for connection with the cold reference terminations of thermocouples inserted into a plurality of cavities in the block using a novel thermally conducting bridging bar having an electrically insulating covering and a corresponding plurality of electrically conducting uninsulated projections secured at successive spaced points of the bar along the insulating covering thereof and parallely extending transversely from the bar for inserting within the block cavities.

15 Claims, 1 Drawing Sheet

5,741,073

UNIFORM TEMPERATURE REFERENCE APPARATUS FOR USE WITH MODULAR TERMINAL BLOCK

The present invention relates to uniform temperature apparatus (UTR) embodying a common copper terminal or terminating conductor to which each of a plurality or matrix of otherwise electrically isolated pairs of thermocouple wire terminations are held mutually isothermal—the point at which each thermocouple is connected to the copper terminal being generally referred to as the "cold junction". More particularly, the invention relates to the type of modular terminal block construction employing a thermal bridging bar such as described in prior U.S. Pat. No. 5,340,216 of co-applicant Robert B. Goldschmidt, issued Aug. 23, 1994 and of common assignee herewith.

BACKGROUND

As explained in said prior U.S. Pat. No. 5,340,216, within many industries, there is a need to make accurate temperature measurements utilizing thermocouples. A key source of temperature measurements error in such systems is the temperature difference between any of the cold junction thermocouple connections and the cold junction reference sensor. The before-mentioned uniformed temperature reference (UTR) is a passive thermal-mechanical device which is utilized to reduce the error due to the temperature differences described above, the UTR sewing to increase the thermal conduction path between the cold junctions and the cold junction reference, while preserving the electrical isolation between these points.

Obviating the need for earlier used ceramic wafers and the like for achieving electrical isolation between terminals of a matrix of sets of thermocouple wires, while providing thermal coupling between such terminals to attain the desired uniform thermal reference function, the previously mentioned thermal bridging bar concept of said patent, used in conjunction with a modular screw terminal block, has provided significant improvements. Among these have been lower manufacturing and assembly cost, including by the end user, higher accuracy from close thermal contact of each UTR member with the associated cold junction, and with shortened thermal paths, as well.

As described in said patent, the terminal block is provided with a plurality of intermediate cavities for receiving corresponding projections from the thermal bridging bar to enable screw-terminal applied pressure to achieve clamping that establishes compressional electrical connection between one side of a thermocouple wire inserted within a cavity and the common copper terminal, and compressional thermal contact with the inserts corresponding bridging bar projection of the thermal bridging bar on the other side of the thermal couple wire within the cavity.

While highly successful in operation, occasions have arisen in some applications where the stress of the high clamping pressure upon the bridging bar projections inserted within the cavities and clamped to the thermocouple wire therein (as much as about 200.00 psi) has caused deteriorating and/or cracking of the projection insulating coating (such as an aluminum oxide coating, as described in said patent).

In addition, at times and in certain applications, the electrical connection between the thermocouple wire and the copper terminal may require increased reliability.

It is to the solution of such and related problems, accordingly, that the improvement of the present invention is thus principally directed.

OBJECTS OF INVENTION

It is accordingly an object of the present invention to provide a new and improved thermal bridging bar—modular UTR terminal block apparatus that shall not be subject to the above-described limitations and problems, but, to the contrary, provides for improved mechanical clamping and thermal bridging, and with highly reliable thermocouple wire-to-copper terminal electrical connection.

A further object is to provide such a novel apparatus in which the electrical barrier required of the bridging bar between each thermocouple wire thermally contacting corresponding bridging bar projection is provided at regions remote from the high pressure area of the compressional contact of the projection with its corresponding thermocouple wire in the corresponding block cavity.

Other and further objects will be explained hereinafter and are more particularly delineated in the appended claims.

SUMMARY

In summary, however, from one of its important aspects, the invention embraces a uniform temperature block system for connection with an input reference wire of a thermocouple and forming a cold junction therewith, said system comprising a metallic modular connector block having an insulated termination cavity formed therein; a pair of openings communicating with the cavity, one of said pair of openings receiving a terminal clamping device and a second of said pair of openings receiving a bared end of said reference wire; a thermally conducting bridging bar extending externally along the cavity of said block and provided with an electrically insulating covering, the bridging bar having extending therefrom and secured to said insulating covering thereof, a thermally and electrically conducting uninsulated projection, the projection being insertable into said cavity through said second opening, and the projection being positioned in said second opening between the bared end of the input reference wire and a termination conductor; whereby operation of the clamping device presses the bared end of the reference wire to establish compressional electrical connection to one side of the projection, and to compress the opposite side of the projection into compressional electrical and thermal contact with the termination conductor.

Preferred and best mode embodiments and design features are later described.

DRAWINGS

Figure 2:
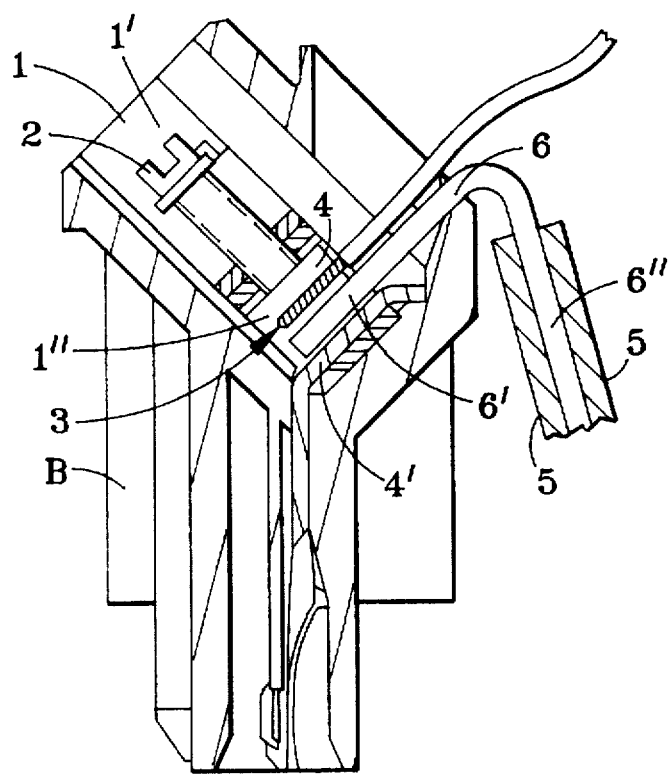

The invention will now be described in connection with the accompanying drawings, FIG. 1 of which is an isometric view of the improved UTR block and thermal bridging bar, of the invention shown in unassembled condition; and FIG. 2 is a transverse cross-sectional view, upon an enlarged scale, showing the clamping action upon a thermocouple wire with the bridging bar projections assembled within the block cavities.

DESCRIPTION OF INVENTION

A modular metal or conducting longitudinal screw-terminal block is shown at B in FIG. 1 having a plurality of in-line intermediate V-shaped termination cavities 1 formed therein, mutually insulated by compartments 7 and each comprising a pair of upper and lower angularly intersecting slot cavity openings 1' and 1". An adjustable screw 2 is mounted in the opening of each upper cavity 1' to exert pressure against a flange 4, engagingly to clamp against one side (upper) of a bared thermocouple input wire 3 insulated within the opening of the lower cavity 1", as shown in FIG. 2, and ultimately to establish compressional electrical contact between the input wire and a copper terminating conductor 4', in a manner similar to that described in said patent.

The screw is adjusted to effect this electrical compressional clamping contact with the terminal conductor 4' after the application of a longitudinal bridging bar 5 juxtaposed to and along the block B, with the plurality or comb of transversely extending projection legs 6' received within the plurality of lower cavity openings 1" of the block. Each bridging bar projection leg 6' is thus inserted under the bared thermocouple reference wire 3 inserted within the lower cavity portion (s) 1" of the block B and against the terminating conductor 4', as illustrated.

The same results attained with the structure of said patent are thus achieved, with the thermal bridging bar 5 extending externally along the openings 1" of the cavities of the block B, and the inserted bridging bar projections 6' compressed into thermal contact with the lower sides of the respective bared thermocouple reference wires inserted in the respective lower cavities, and compressed into electrical connection with the block termination conductor 4'. As described in said patent, a cold junction reference sensor (not shown) may be used, when desired, either mounted on the body of the thermal bridging bar assembly or alternatively in close proximity to one of the connector cavities.

In the structure of said patent, the thermal bridging bar 5 and its projections 6 are described as preferably coated with an insulating covering 5', such as hard anodizing insulation on an aluminum construction. As previously explained, however, under some applications, the very high pressure of clamping upon such insulation-covered projections has resulted in deleterious deterioration and/or cracking of the insulating coating on the projections. In addition, the clamping may not always result, in some uses, with the most reliable electrical connections to the terminal conductor in the circuit about each cavity. Since there is no way to avoid such high pressure points, these problems proved difficult satisfactorily to remedy, particularly with fool-proof repeatability.

Finally, it was discovered that by making the projections conductive instead of carrying the electrically insulating coatings, but while isolating each projection none-the-less from all the other projections of the bridging bar, though maintaining all of them in thermal contact, this problem was admirably overcome. The preferred projections 6 are shown of L-shaped configuration with a first leg 6" adjacent the bridging bar 5 and a leg 6' extending transversly therefrom. Specifically, by mounting successive electrically (and thermally) conductive projection portions 6" at spaced points longitudinally along and to the insulated bridging bar (as of externally anodized aluminum), each projection is then electrically isolated from the other projections by virtue of its mounting attachment to the outer electrical insulation of the bridging bar; but each is thermally connected to all other projections by the bridging bar.

Considering the parallel array of electrically and thermally conductive transverse projection legs 6', when such are inserted and held within the lower cavities 1" and engagement with and between the bared thermocouple wires therein and the terminating conductor 4', the high clamping pressure points are directed upon the bare conducting projections and not upon crackable insulating coatings as in the construction of the patented system. The required electrical barrier between each thermocouple wire in thermal compressional contact with a corresponding bridging bar projection has thus been removed from the high pressure points of clamping at 6' within the cavity, remotely to and adjacent the electrical bridging bar at 6", thus obviating the above-described difficulties. Synergistically, moreover, by virtue of the surface electrically conductive properties of the projections, simultaneous improvement has also been discovered in the surrounding or circumferential electrical conductivity and thus in the reliability of the electrical contact within the cavity circuit.

A convenient way of attaching the projections 6 to the bridging bar 5 is illustrated, with the projection legs 6" attached between compressed parallel longitudinal anodized bars or plates 5, and the transverse legs 6' extending laterally from the top of the bars or plates.

While the invention has been described in connection with screw-terminal clamping, if desired, other adjustable clamping devices may also be used such as, for example, spring-pressure connectors or clamping devices, also represented at 2. Further modifications will also occur to those skilled in this art, and such are considered to fall within the spirit and scope of the invention as defined in the appended claims.

What is claimed is:

1. A uniform temperature block system for connection with an input reference wire of a thermocouple and forming a cold junction therewith, said system comprising a metallic modular connector block having an insulated termination cavity formed therein;

a pair of openings communicating with the cavity, one of said pair of openings receiving a terminal clamping device ;and a second of said pair of openings receiving a bared end of said reference wire;

a thermally conducting bridging bar extending externally along the cavity of said block and provided with an electrically insulating covering, the bridging bar having extending therefrom and secured to said insulating covering thereof, an inner leg of a thermally and electrically conducting uninsulated projection extension, the projection being insertable into said cavity through said second opening, and the projection being positioned in said second opening between the bared end of the input reference wire and a termination conductor;

whereby operation of the clamping device presses the bared end of the reference wire to establish compressional electrical connection to one side of the projection, and to compress the opposite side of the projection into compressional electrical and thermal contact with the terminating conductor.

2. A uniform temperature reference block system as claimed in claim 1 and in which the clamping device is a threaded screw terminal mounted in said one opening of the cavity.

3. A uniform temperature reference block system as claimed in claim 1 and in which the clamping device is a spring-pressure device.

4. A uniform temperature reference block system as claimed in claim 1 and in which the cavity is of V shape formed by angular intersecting slots.

5. A uniform temperature reference block system as claimed in claim 1 and in which the bridging bar is of anodized aluminum and the conducting projection is of substantially L-shape with a first inner leg secured to the anodized surface of the bar and a second leg of the L extending transversely therefrom for inserting within the said second opening of the cavity when the bar is juxtaposed to the block.

6. A uniform temperature reference block system as claimed in claim 5 and in which the bridging bar is of compressed parallel plates, with the first leg of the projection received and attached between the plates, and the second leg extending laterally from the top of the plates.

7. A uniform temperature reference block system for connection with input reference wires of a plurality of thermocouples and forming cold junctions therewith, said system comprising:

a metallic modular connector block having a plurality of insulated successive termination cavities formed therein;

a pair of openings communicating with each said cavity, one of said pair of openings receiving a terminal clamping device and a second of said pair of openings receiving a bared end of an input reference wire;

a thermally conducting bridging bar externally extending along the openings of the cavities of said block and provided with an electrically insulating covering, the bridging bar having extending therefrom and secured to the insulating covering thereof, inner legs of a plurality of thermally and electrically conducting uninsulated projections corresponding to the plurality of pairs of openings, the projection extensions being insertable into said cavities through said second openings, with each projection positioned in its corresponding second opening between the bared end of an input reference wire and a termination conductor;

whereby operating the terminal clamping devices presses the bared end of the corresponding reference wire to establish compressional electrical connection to one side of the corresponding projection, and to compress the opposite side of the projection into compressional electrical and thermal contact with the termination conductor.

8. A uniform temperature reference block system as claimed in claim 7 and in which each terminal clamping device is a terminal screw.

9. A uniform temperature reference block system as claimed in claim 7 and in which each terminal clamping device is a spring pressure device.

10. A uniform temperature reference block system as claimed in claim 7 and in which the bridging bar is of anodized aluminum and the plurality of conducting projections are of L-shape, each having a first inner leg secured to the anodized surface of the bar and a second leg extending transversely therefrom for inserting within the corresponding said second opening of the corresponding cavity when the bar is applied to the block.

11. A uniform temperative reference block system as claimed in claim 10 and in which the bridging bar is of compressed parallel plates with the first leg of each L-shaped projection received and attached within the plates and with the corresponding first legs of the successive projections spaced longitudinally therealong, and the second legs of the projections extending laterally and parallelly from the top edge of the plates.

12. For use with a uniform temperature reference block system having a plurality of in-line thermocouple wire-receiving cavities, a thermally conducting longitudinally extending bridging bar having an electrically insulating covering, and a corresponding plurality of electrically conducting uninsulated projections, secured at one end to successive spaced points of the bar along the insulating covering thereof and parallely extending transversely of the bar for inserting within the block cavities when the bar is applied to the block system.

13. A thermal bridging bar as claimed in claim 12 and in which each projection has a first leg adjacent and secured at said one end to the insulating covering at its corresponding point therealong, and a second leg transversely projecting from the bar for said inserting within the corresponding block cavity.

14. A thermal bridging bar as claimed in claim 13 and in which the bridging bar is of parallel plates and each projection is of L-shape, with the first leg of each projection received and attached within the parallel plates, and the second leg extending laterally from the top of the plates.

15. A thermal bridging bar as claimed in claim 14 and in which the bar and its plates is made of anodized aluminum.

* * * * *